(12) United States Patent
Ardanese et al.

(10) Patent No.: US 9,091,194 B2
(45) Date of Patent: Jul. 28, 2015

(54) TEMPERATURE GRADIENT CORRECTION OF AMMONIA STORAGE MODEL

(71) Applicant: GM Global Technology Operations LLC, Detroit, MI (US)

(72) Inventors: Raffaello Ardanese, Turin (IT); Justin Adam Shetney, Livonia, MI (US); James M. Perrin, Livonia, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/959,029

(22) Filed: Aug. 5, 2013

(65) Prior Publication Data
US 2015/0033704 A1    Feb. 5, 2015

(51) Int. Cl.
| F01N 3/20 | (2006.01) |
|---|---|
| F01N 9/00 | (2006.01) |
| F01N 11/00 | (2006.01) |
| F01N 3/10 | (2006.01) |
| F01N 13/00 | (2010.01) |

(52) U.S. Cl.
CPC ............... *F01N 3/208* (2013.01); *F01N 9/005* (2013.01); *F01N 9/007* (2013.01); *F01N 11/005* (2013.01); *F01N 3/106* (2013.01); *F01N 13/009* (2014.06); *F01N 2330/06* (2013.01); *F01N 2370/04* (2013.01); *F01N 2550/00* (2013.01); *F01N 2560/06* (2013.01); *F01N 2560/14* (2013.01); *F01N 2610/02* (2013.01); *F01N 2900/0412* (2013.01); *F01N 2900/0416* (2013.01); *F01N 2900/1404* (2013.01); *F01N 2900/1602* (2013.01); *F01N 2900/1616* (2013.01); *F01N 2900/1622* (2013.01)

(58) Field of Classification Search
CPC ... F01N 3/208; F01N 11/005; F01N 2560/06; F01N 2610/02; F01N 2900/0412; F01N 2900/1602; F01N 2900/1616; F01N 9/005; F01N 9/007
USPC ............................. 60/274, 277, 286, 295, 301
See application file for complete search history.

(56) References Cited

U.S. PATENT DOCUMENTS

| 8,834,820 | B1 * | 9/2014 | Mowers et al. | 423/213.2 |
|---|---|---|---|---|
| 2010/0028228 | A1 * | 2/2010 | Gady et al. | 423/213.5 |
| 2011/0056188 | A1 * | 3/2011 | Asaura et al. | 60/276 |
| 2011/0099985 | A1 * | 5/2011 | Yasui et al. | 60/287 |
| 2011/0203259 | A1 * | 8/2011 | Upadhyay et al. | 60/274 |
| 2011/0265457 | A1 * | 11/2011 | Sato | 60/285 |

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

An exhaust gas treatment system includes a SCR device that stores a reductant that reacts with the NOx emissions and a reductant supply system to inject the reductant according to a reductant load model. At least one temperature sensor or model generates a temperature signal indicating an SCR temperature of the SCR device. The exhaust gas treatment system further includes a control module in electrical communication with the reductant supply system. The control module is configured to determine an amount of reductant that slips from the SCR device based on the at least one temperature signal and the rate of change of the SCR temperature. The control module further determines a correction factor based on the amount of slipped reductant to modify the reductant load model.

14 Claims, 3 Drawing Sheets

TEMPERATURE GRADIENT CORRECTION OF AMMONIA STORAGE MODEL

FIELD OF THE INVENTION

The subject invention relates to exhaust treatment systems, and more particularly, to a selective catalyst reduction and ammonia injection system.

BACKGROUND

The exhaust gas emitted from an internal combustion (IC) engine, is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Typically, catalyst compositions disposed on catalyst supports or substrates are provided in an engine exhaust system to convert certain, or all of these exhaust constituents into non-regulated exhaust gas components.

Exhaust gas treatment systems typically include selective catalytic reductant (SCR) devices to reduce the amount of NOx in the exhaust gas. The typical exhaust treatment system also includes a reductant injection system that injects a reductant such as, for example, ammonia ($NH_3$). The SCR devices make use of $NH_3$ to reduce the NOx. For example, when the proper amount of $NH_3$ is supplied to the SCR device under the proper conditions, the $NH_3$ reacts with the NOx in the presence of an SCR device to reduce the NOx emissions. However, if the reduction reaction rate is too slow, or if there is excess $NH_3$ in the exhaust, $NH_3$ can slip from the SCR device and be emitted to the environment.

SUMMARY OF THE INVENTION

In at least one exemplary embodiment, an exhaust gas treatment system includes a SCR device that stores a reductant that reacts with NOx emissions and a reductant supply system to inject the reductant according to a reductant load model. At least one temperature sensor or model indicates a temperature of the SCR device. The exhaust gas treatment system further includes a control module in electrical communication with the reductant supply system and at least one exhaust temperature sensor or model to predict the temperature of the SCR device. The control module is configured to determine an amount of reductant that slips from the SCR device based on a measured or predicted SCR temperature, and the rate of change of the SCR temperature. The control module further determines a correction factor based on the amount of slipped reductant to modify the reductant load model.

In another exemplary embodiment, a control module generates a correction factor that controls operation of a reductant supply system. The control module includes a memory unit that stores a reductant load model that indicates an amount of reductant to inject in response to one or more driving conditions. A reductant control module is configured to control the reductant supply system to inject the amount of reductant based on the reductant load model. A reductant slip correction module is configured to determine the amount of reductant that slips from an SCR device based on the temperature of the SCR and the rate of change of the SCR. The reductant slip correction module further determines the correction factor based on the amount of slipped reductant to modify the reductant load model.

In yet another exemplary embodiment, a method of correcting a reductant load model that controls an amount of reductant injected in an exhaust treatment system comprises storing a reductant on an SCR device to reduce an amount of NOx emissions contained in exhaust gas. The method further comprises the generation of at least one temperature signal to indicate the temperature of the SCR device. The method further determines an amount of reductant that slips from the SCR device based on this temperature and the rate of change of the SCR temperature. The method further comprises determining a correction factor based on the amount of reductant that slips from the SCR device, and modifying the reductant load model based on the correction factor.

The above features and exemplary embodiments are readily apparent from the following detailed description when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
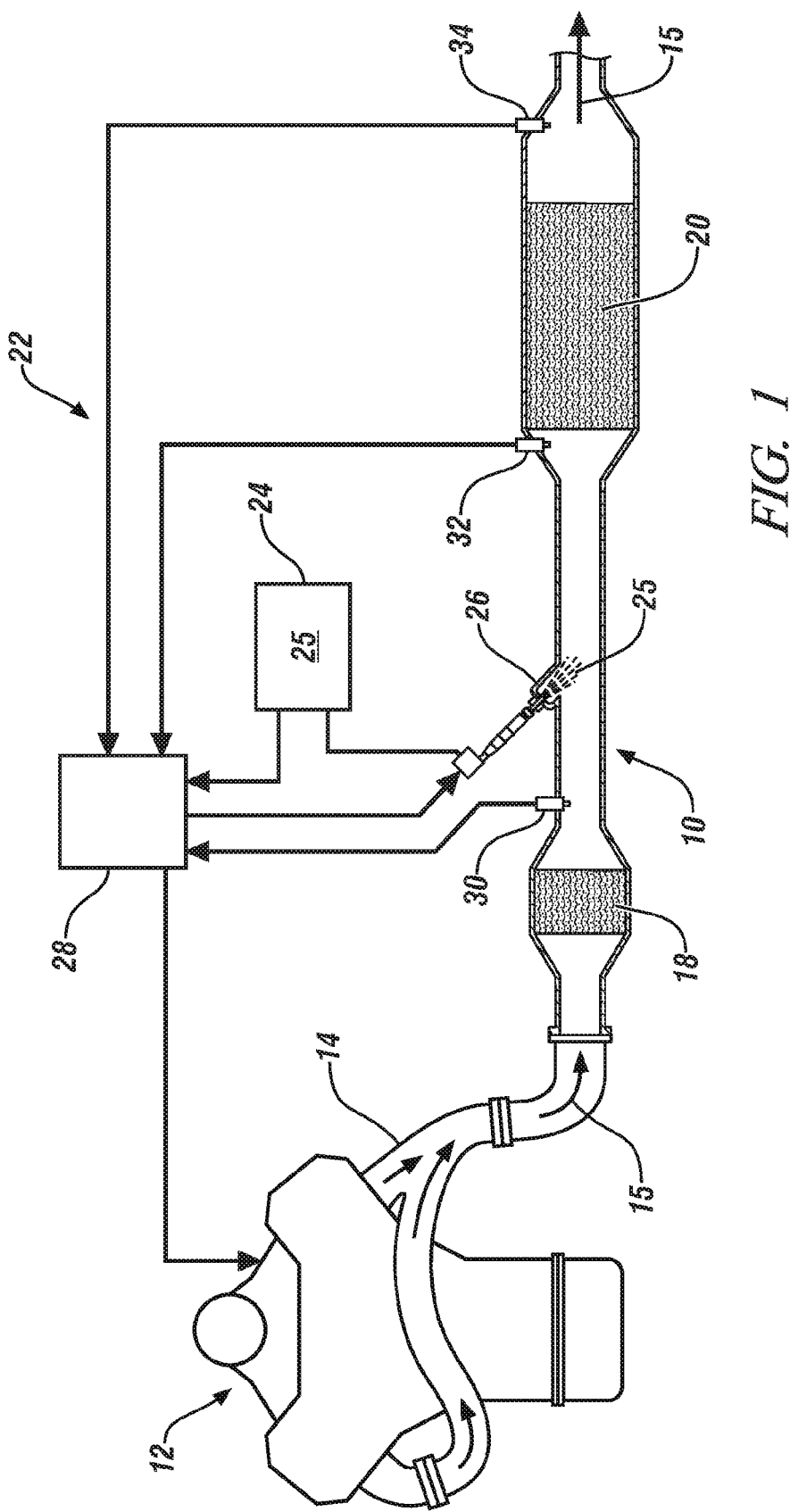
FIG. 1 is a schematic diagram of an exhaust gas treatment system including a reductant supply system in accordance with exemplary embodiments.

Referring now to FIG. 1, an exemplary embodiment is directed to an exhaust gas treatment system 10, for the reduction of regulated exhaust gas constituents of an internal combustion (IC) engine 12. The exhaust gas treatment system 10 described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, but are not limited to, an oxidation catalyst device (OC) 18, and a two-way selective catalytic reduction and particulate filter device (SCR/PF) 20 (i.e., SCR device 20). As can be appreciated, the exhaust gas treatment system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise several segments, transports exhaust gas 15 from the engine 12 to the various exhaust treatment devices of the exhaust gas treatment system 10. As can be appreciated, the OC 18 can be of various flow-through, oxidation catalyst devices known in the art. In various embodiments the OC 18 may include a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with the exhaust gas conduit 14. The substrate may include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR device 20 may be disposed downstream of the OC 18, and is configured to filter the exhaust gas 15 of carbon and other particulates as well as to reduce NOx constituents in the exhaust gas. As can be appreciated, the SCR device 20 can be constructed of various materials known in the art. In various embodiments, for example, the SCR device 20 may be constructed using a wall flow monolith filter or other devices, such as, for example, wound or packed fiber filters, open cell foams, sintered metal fibers, etc. In various embodiments, the SCR device 20 includes an SCR device catalyst composition applied to the filter. The SCR device 20 may utilize a reductant, such as ammonia ($NH_3$) to reduce the NOx. More specifically, the SCR device catalyst composition can contain a zeolite and one or more base metal components such as iron (Fe), cobalt (Co), copper (Cu) or vanadium (V) which operate efficiently to convert NOx constituents in the exhaust gas 15 in the presence of $NH_3$. The reductant utilized by the SCR device 20 may be in the form of a gas, a liquid, or an aqueous urea solution and may be mixed with air to aid in the dispersing of the injected spray.

In at least one exemplary embodiment illustrated in FIG. 1, a $NH_3$ reductant may be supplied from a reductant supply system 22. The reductant supply system 22 includes a reductant supply source 24, an injector 26, and a control module 28. The reductant supply source 24 stores a reductant 25 and is in fluid communication with the injector 26. The reductant 25 may include, but is not limited to, $NH_3$, and urea. Accordingly, the injector 26 may inject a selectable amount of reductant 25 into the exhaust gas conduit 14 such that the reductant 25 is introduced to the exhaust gas 15 at a location upstream of the SCR device 20.

The control module 28 may control the engine 12 and the reductant supply system 22 based on sensed and/or modeled data. In various embodiments, the control module 28 further diagnoses one or more sub-systems and/or devices of the exhaust gas treatment system 10 based on one or more sensed and/or modeled inputs based on the diagnostic methods and systems of the present disclosure. In one example, the control module 28 is in electrical communication with a first temperature sensor 30 disposed at the outlet of the OC 18, a second temperature sensor 32 disposed upstream from the SCR device 20 and a third temperature sensor 34 disposed downstream from the SCR device 20. The first temperature sensor 30 senses a temperature of exhaust gas 15 at the outlet of the OC 18 and generates a first temperature signal based thereon. The second temperature sensor 32 senses a temperature of exhaust gas 15 at the inlet of the SCR device 20 and generates a second temperature signal based thereon. A third temperature sensor 34 senses a temperature of exhaust gas 15 at the outlet of the SCR device 20 and generates a third temperature signal based thereon. Although the exemplary embodiment illustrated in FIG. 1 describes three sensors, it is appreciated that less or more sensors may be included. In addition, the invention is not limited to the location of the sensors described above.

The control module 28 may determine an absolute temperature of the SCR device 20 (i.e., the SCR absolute temperature) and/or a temperature gradient of the SCR device 20 (i.e., the SCR temperature gradient). The SCR temperature may be determined according to various, measurements, algorithms and/or models known to those of ordinary skill in the art. The temperature gradient is the rate of change of the SCR temperature. That is, the SCR temperature gradient is the change in SCR temperature over time. The SCR temperature may be measured in units of kelvins (K) per second (s), (i.e., K/s).

Generally speaking, the control module 28 receives one or more temperature signals from one or more temperature modules, and controls operation of the injector 26 according to a reductant storage model. The temperature modules may include temperature sensors 30, 32, 34 as illustrated in FIG. 1. In another exemplary embodiment, the temperature module may include control modules that store one or more temperature models. The temperatures sensors 30, 32, 34, and/or the temperature models may provide a determined temperature of a respective component and/or thermal area. For example, the temperature sensors 30, 32, 34 and/or a temperature model may determine a temperature indicating an SCR temperature of the SCR device 20. In addition, the control module 28 may determine a correction coefficient corresponding to the reductant storage model based on the temperature gradient of the SCR device 20, and may more precisely control the amount of injected reductant 25 provided by the injector 26, as described in greater detail below. Accordingly, the supply of reductant 25 may be utilized more efficiently.

Figure 2A:
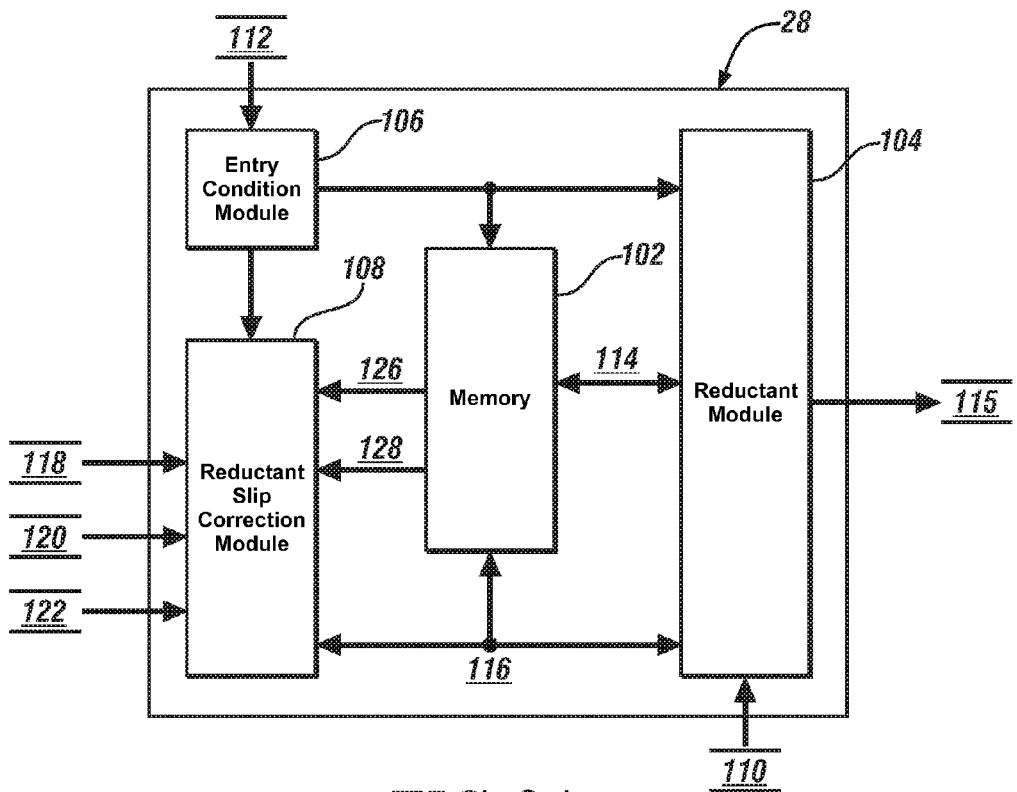
FIG. 2 is a block diagram illustrating a control module that generates a correction factor of reductant load model of a reductant supply system in accordance with an exemplary embodiment.
Figure 2B:
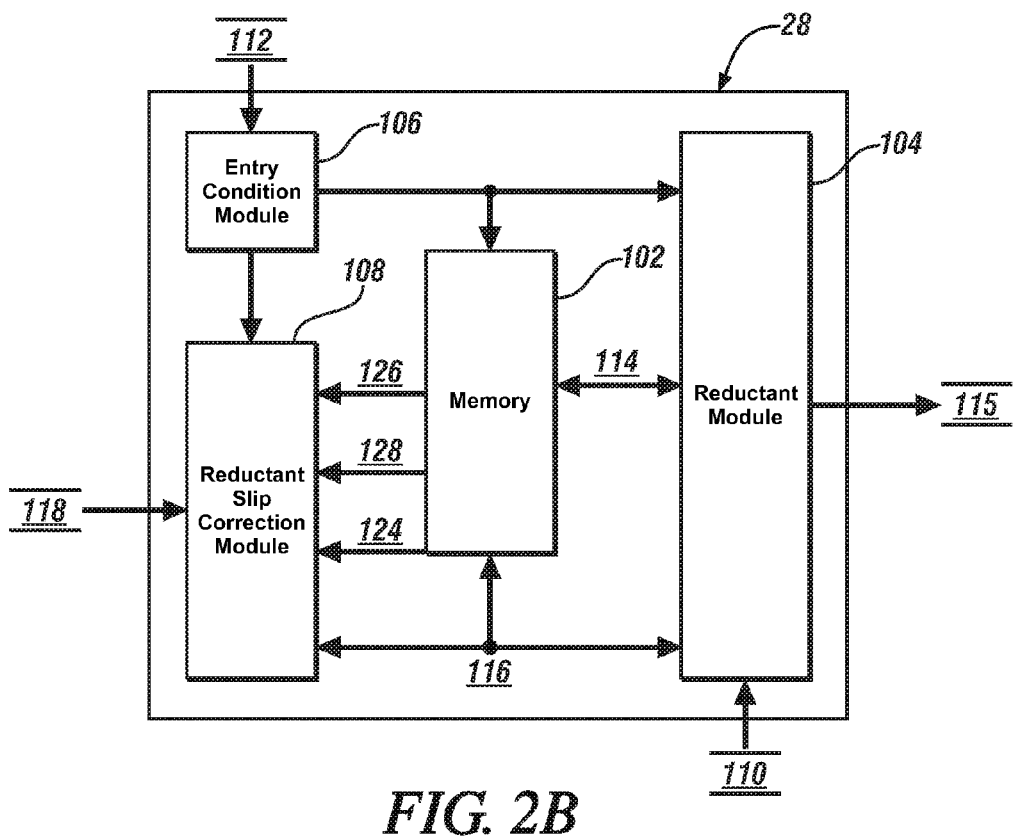

Turning now to FIG. 2, a block diagram illustrates a control module 28 that determines a correction coefficient corresponding to a reductant storage model to more precisely control the amount of injected reductant 25 provided by the reductant supply system 22. Various embodiments of the exhaust gas treatment system 10 of FIG. 1 according to the present disclosure may include any number of sub-modules embedded within the control module 28. As can be appreciated, the sub-modules shown in FIG. 2 may be combined or further partitioned as well.

As illustrated in FIG. 2, the control module 28 according to at least one embodiment includes memory 102, a reductant module 104, an entry condition module 106, and a reductant slip correction module 108. Each of the modules 104-108 interfaces and electrically communicates with the memory 102 to retrieve and update stored values as needed.

In one embodiment, the memory 102 stores one or more threshold values, time periods over which the temperatures were measured, a number of configurable limits, maps, data values, variables, and system models used to control the reductant supply system 22. In at least one exemplary embodiment, the memory 102 stores a reductant load model that determines an amount of reductant contained on the SCR device 20. The reductant load model utilizes various operating parameters provided by at least one model and/or vehicle sensors to determine the stored reductant including, but not limited to, exhaust flow rate, and reductant injection rate.

The memory 102 may also store one or more temperature thresholds and/or temperature threshold ranges corresponding to a respective soot combustion temperature. In addition, the memory 102 may store one or more temperature SCR device models. For example, at least one temperature SCR device model may include an absolute temperature model and a temperature gradient model. The absolute temperature model may utilize the temperature signal generated by the first temperature sensor 30 disposed at the outlet of the OC 18, a distance between the OC 18 and the SCR device 20, and an ambient temperature of the SCR device 20 to determine the absolute temperature as discussed above. The temperature gradient model may determine a temperature change of the SCR device 20 based on the change in temperature at the outlet of the SCR device 20 over a selected time period.

The reductant module 104 may process a reductant storage model signal 114 indicative of a reductant storage model stored in the memory 102 to control operation of the reductant supply system 22. For example, the reductant storage model may indicate the amount of reductant that should be stored, (i.e., contained) on the SCR device 20 during various driving conditions 110. By detecting the driving conditions 110 by one or more sensors (e.g. temperature sensors, pressure sensors, NOx sensors, etc.), the reductant module 104 determines an amount of reductant 25 to be injected and generates an injector control signal 115 to control the injector 26 accordingly.

In at least one embodiment, the reductant module 104 may control the injector 26 to inject the reductant 25 in response to receiving one or more entry conditions 112 provided by the entry condition module 106. The entry conditions 112 may include, for example, an excessive increase in exhaust temperature, which causes an excessive temperature change of the SCR device 20. The excessive increase in exhaust temperature may be detected by comparing a change in the exhaust gas temperature to a predetermined threshold. If the change in exhaust gas temperature exceeds the temperature threshold, the entry condition 112 (i.e., the excessive temperature change) may be determined. When the SCR device 20 realizes excessive temperature changes, however, reductant may slip from the SCR device 20. Consequently, the amount of reductant stored on the SCR device 20 is reduced.

The reductant slip correction module 108 may determine the amount of reductant that slips from the SCR device 20 and may generate a correction signal 116 indicating a correction factor that compensates for the slipped reductant. The amount of reductant slip may be determined when one or more entry conditions 112 provided by the entry condition module 106 occurs, such as an excessive temperature change. The memory 102 may store a reductant slip model that determines the amount of reductant slipped from the SCR device 20 based on the SCR absolute temperature, the SCR temperature gradient, and an actual stored amount (i.e., the amount of reductant currently stored) on the SCR device 20. In at least one embodiment illustrated in FIG. 2, the reductant slip correction module 108 may determine the SCR absolute temperature and the SCR temperature gradient based on first, second, and third temperatures signals 118, 120, 122 provided by the first, second, or third temperatures sensors 30, 32, 34, respectively. In another exemplary embodiment, the reductant slip correction module 108 may determine the SCR absolute temperature and the SCR temperature gradient based on a heat loss model signal indicative of a heat loss model stored in the memory 102 and the first temperature signal 118 provided by the first temperature sensor measuring the inlet and/or outlet temperature of the OC 18.

The amount of reductant stored on the SCR device 20 may be determined according to the reductant load model signal 126 indicative of the reductant load model stored in memory 102 as discussed above. The age of the SCR device 20 may be also be used to further determine the amount of reductant stored on the SCR device 20. For example, as the age (e.g., the amount of use over time) of the SCR device 20 increases, the ability to maintain storage of the reductant decreases. In an exemplary embodiment, an age factor corresponding to a new SCR device 20 may be initially stored in the memory 102. Over time, the reductant module 104 may update the age factor based on a temperature realized by the SCR device 20 over a time period. The age factor may be provided to the reductant slip correction module 108 via an age factor signal 128, and applied to the determined amount of reductant indicated by the reductant load model to more precisely determine the amount of reductant stored on the SCR device 20.

The reductant slip correction module 108 may generate a correction value based on a difference between the amount of reductant contained on the SCR device 20 and the amount of reductant slipped from the SCR device 20. For example, if the amount of reductant contained on the SCR device 20 is determined as 2.0 grams (g) and the amount reductant slipped from the SCR device 20 is 0.2 g, then the reductant slip correction module 108 determines a correction value of 0.2 g, i.e., an additional 0.2 g of reductant 25 is needed. Based on the correction value, an additional amount of reductant 25 (e.g., 0.2 g of additional reductant 25) should be injected to compensate for the reductant slipped from the SCR device 20.

The reductant slip correction module 108 may also determine a corrected amount of injected reductant 25 to achieve a desired load of the SCR device 20 during certain driving conditions. For example, the reductant module 104 may determine a desired reductant load of the SCR device 20, for example 3.0 g of reductant, based on one or more driving conditions of the vehicle. The reductant model may then determine the amount of reductant currently stored on the SCR device 20 taking into account any reductant slipped from the SCR device 20 as discussed above. If, for example, the amount of reductant stored on the SCR device 20 is determined as 2.0 g and the amount reductant slipped from the SCR device 20 is 0.2 g, then the reductant slip correction module 108 determines that the SCR device 20 currently contains 1.8 g. Therefore, reductant slip correction module 108 determines that a total of 1.2 g of reductant must be injected to achieve the desired reductant load of 3.0 g.

Figure 3:
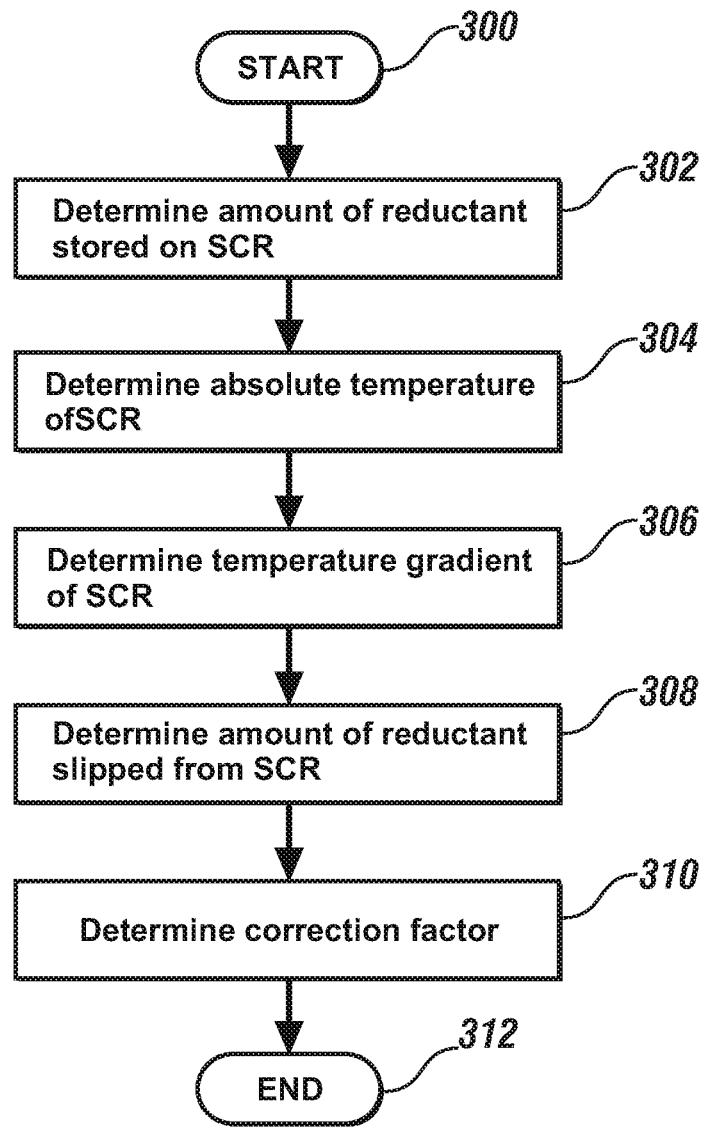
FIG. 3 is a flow diagram illustrating a method of generating a correction factor of a reductant load model in accordance with exemplary embodiments.

Turning now to FIG. 3, a flow diagram illustrates a method of determining a correction factor corresponding to a reductant load model according to an exemplary embodiment. The method begins at operation 300 and proceeds to operation 302 to determine an amount of reductant stored on the SCR device (i.e., a reductant load of the SCR device). The amount of stored reductant may be based, for example, on a reductant load model stored in a memory unit and an age of the SCR device. At operation 304, an absolute temperature of an SCR device included in an exhaust treatment system is determined. The absolute temperature of the SCR device may be determined according to temperature measurements provided by one or more temperature sensors and/or models for example. At operation 306, a temperature gradient of the SCR device is determined. The temperature gradient may be determined according to a change in temperature of the SCR device over a selected time period for example. At operation 308, an amount of reductant slipped from the SCR device is determined based on the absolute temperature and the temperature gradient. Based on the amount of slipped reductant, a correction factor is generated at operation 310, and the method ends at operation 312. The correction factor may be used to determine an amount of additional reductant that should injected to compensate for the reductant that slipped from the SCR device. Accordingly, a more accurate reductant load model may be generated that increases the overall efficiency of a reductant supply system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for use with an internal combustion engine to treat exhaust gas containing NOx emissions, the exhaust gas treatment system comprising:
a selective catalytic reductant (SCR) device that stores a reductant that reacts with the NOx emissions;
a reductant supply system configured to inject the reductant according to a reductant load model; and
an electronic control module including a non-transitory memory having computer readable instructions stored thereon, and a computer processor configured to execute the computer readable instructions that perform operations of:
generating at least one temperature signal indicating an SCR temperature of the SCR device;
determining an actual amount of reductant that slips from the SCR device based on the at least one temperature signal and a rate of change of the SCR temperature;
determining a correction factor based on the actual amount of slipped reductant to modify the reductant load model, the correction factor based on a difference between the actual amount of slipped reductant and an amount of reductant stored on the SCR device, the amount of reductant stored on the SCR device is based on the reductant load model stored in the non-transitory memory, an age of the SCR device, and the correction factor;
calculating the age of SCR device based on a temperature realized by the SCR device over a time period to determine an age factor;
updating the load model based on the age factor to the determine the amount of reductant stored on the SCR device;
determining a desired load of the SCR device based on at least one driving condition; and
adjusting the reductant injected by the reductant supply system based on the updated load model and the correction factor to achieve the desired load.

2. The exhaust gas treatment system of claim 1, wherein the amount of slipped reductant is based on an absolute temperature model of the SCR device indicative of the SCR temperature and a temperature gradient model of the SCR device that is indicative of the rate of change of the SCR temperature.

3. The exhaust gas treatment system of claim 2, further comprising at least one of a temperature sensor that is in electrical communication with the electronic control module, and that measures the SCR temperature and a temperature model that estimates the SCR temperature, wherein the amount of reductant that is injected is adjusted in response to modifying the reductant load model with the correction factor.

4. The exhaust gas treatment system of claim 3, wherein the correction factor is determined in response to a temperature change of the SCR device exceeding a threshold value.

5. An electronic control module including non-transitory memory that stores computer readable instructions, and a computer processor configured to execute the computer readable instructions, wherein
the non-transitory memory further stores a reductant load model indicating an amount of reductant to inject in response to one or more driving conditions, and an initial SCR age value indicating an initial age of a SCR device, and
wherein the computer process executes the computer readable instructions to perform the operations of:
generating a correction factor that controls operation of a reductant supply system;
controlling the reductant supply system to inject an amount of reductant based on the reductant load model;
determining an actual amount of reductant that slips from the SCR device based on at least one temperature signal and a rate of change of a SCR temperature of the SCR device;
determining the correction factor based on the actual amount of slipped reductant to modify the reductant load model;
determining an age factor and updating the age factor based on a temperature realized by the SCR device over a time period, wherein the amount of reductant stored on the SCR device is based on the reductant load model, the age of the SCR device, and the correction factor;
generating an age factor signal indicating the age factor that is applied to the determined amount of reductant indicated by the reductant load model to more precisely determine the amount of reductant stored on the SCR device;
determining a desired load of the SCR device based on at least one driving condition, and
controlling the reductant supply system to inject an amount of reductant based on the updated load model and the correction factor to achieve the desired load.

6. The electronic control module of claim 5, wherein the amount of slipped reductant is determined based on an absolute temperature of the SCR device and a temperature gradient of the SCR device.

7. The electronic control module of claim 6, wherein the amount of reductant injected is adjusted in response to modifying the reductant load model with the correction factor.

8. The electronic control module of claim 7, wherein the correction factor is determined based on an actual amount of reductant stored on the SCR device and the amount of slipped reductant.

9. The electronic control module of claim 8, wherein the correction factor is determined in response to a temperature change of the SCR device exceeding a threshold value.

10. A method of correcting a reductant load model that controls an amount of reductant injected in an exhaust treatment system of an internal combustion engine, the method comprising:
storing a reductant on an SCR device to reduce an amount of NOx emissions contained in exhaust gas flowing through the exhaust treatment system;
generating at least one temperature signal indicating a SCR temperature of the SCR device;
determining an actual amount of reductant that slips from the SCR device based on the at least one temperature signal and a rate of change of the SCR temperature;
calculating an age factor indicating an age of SCR device based on a temperature realized by the SCR device over a time period;
determining a correction factor based on the actual amount of reductant that slips from the SCR device;
determining an amount of reductant stored on the SCR device according to a reductant storage model, the age of the SCR device, and the correction factor;
modifying the reductant load model based on the correction factor and the age factor; and
determining a desired load of the SCR device based on at least one driving condition, and controlling the amount of reductant injected based on the modified reductant load model and the correction factor to achieve the desired load.

11. The method of claim 10, wherein the amount of slipped reductant is based on an absolute temperature of the SCR device and a temperature gradient of the SCR device.

12. The method of claim 11, further comprising adjusting the amount of reductant injected in response to modifying the reductant load model with the correction factor.

13. The method of claim 12, wherein the determining an age factor further comprises updating the age factor over the time period.

14. The method of claim 13, further comprising determining the correction factor in response to a temperature change of the SCR device exceeding a threshold value.

* * * * *